Dec. 13, 1966     P. A. GLORIOSO     3,291,958
STUD WELDING
Filed June 5, 1964                              2 Sheets-Sheet 2
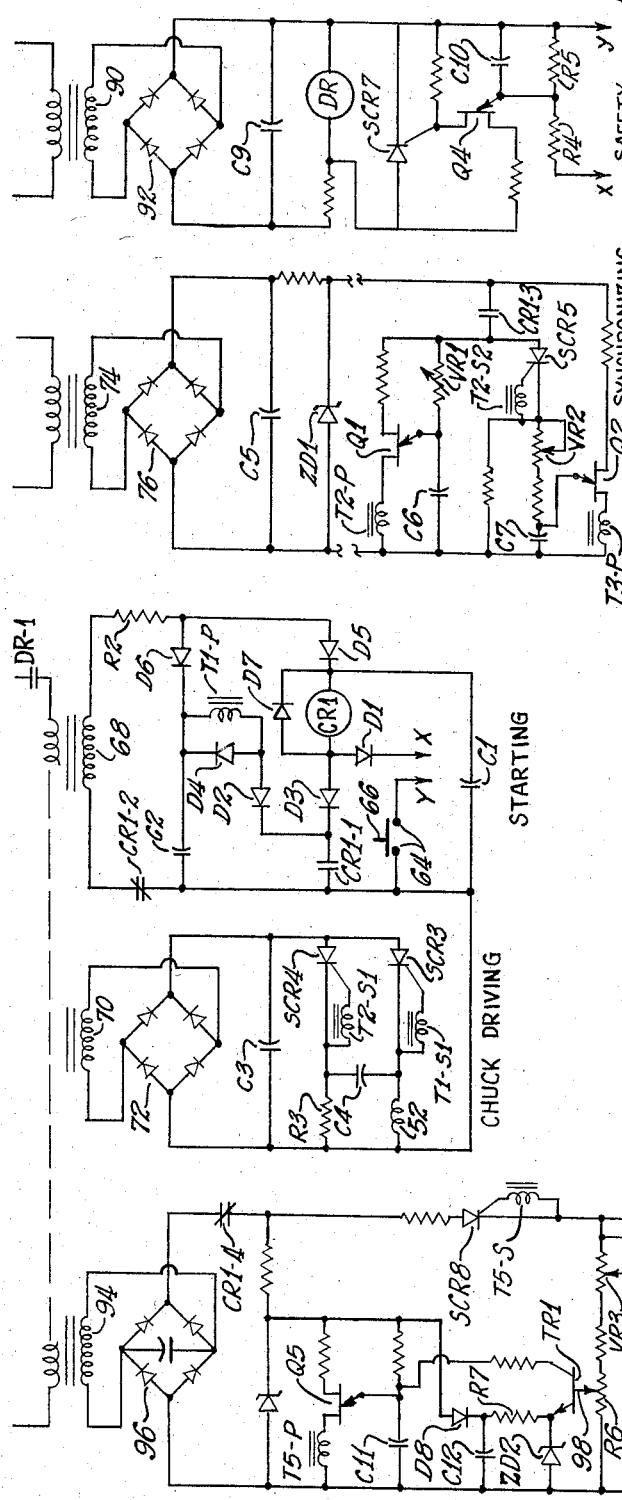
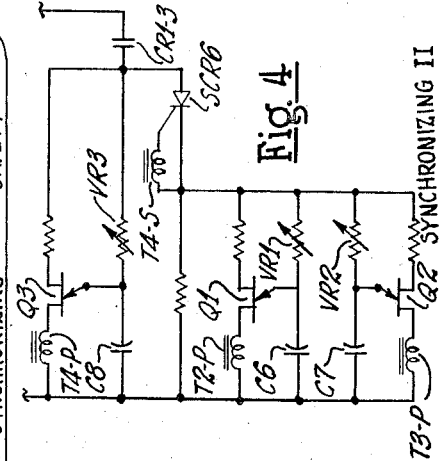
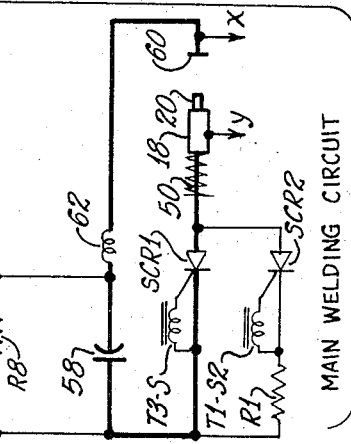
INVENTOR.
PAUL A. GLORIOSO
BY
ATTORNEYS United States Patent Office 3,291,958
Patented Dec. 13, 1966

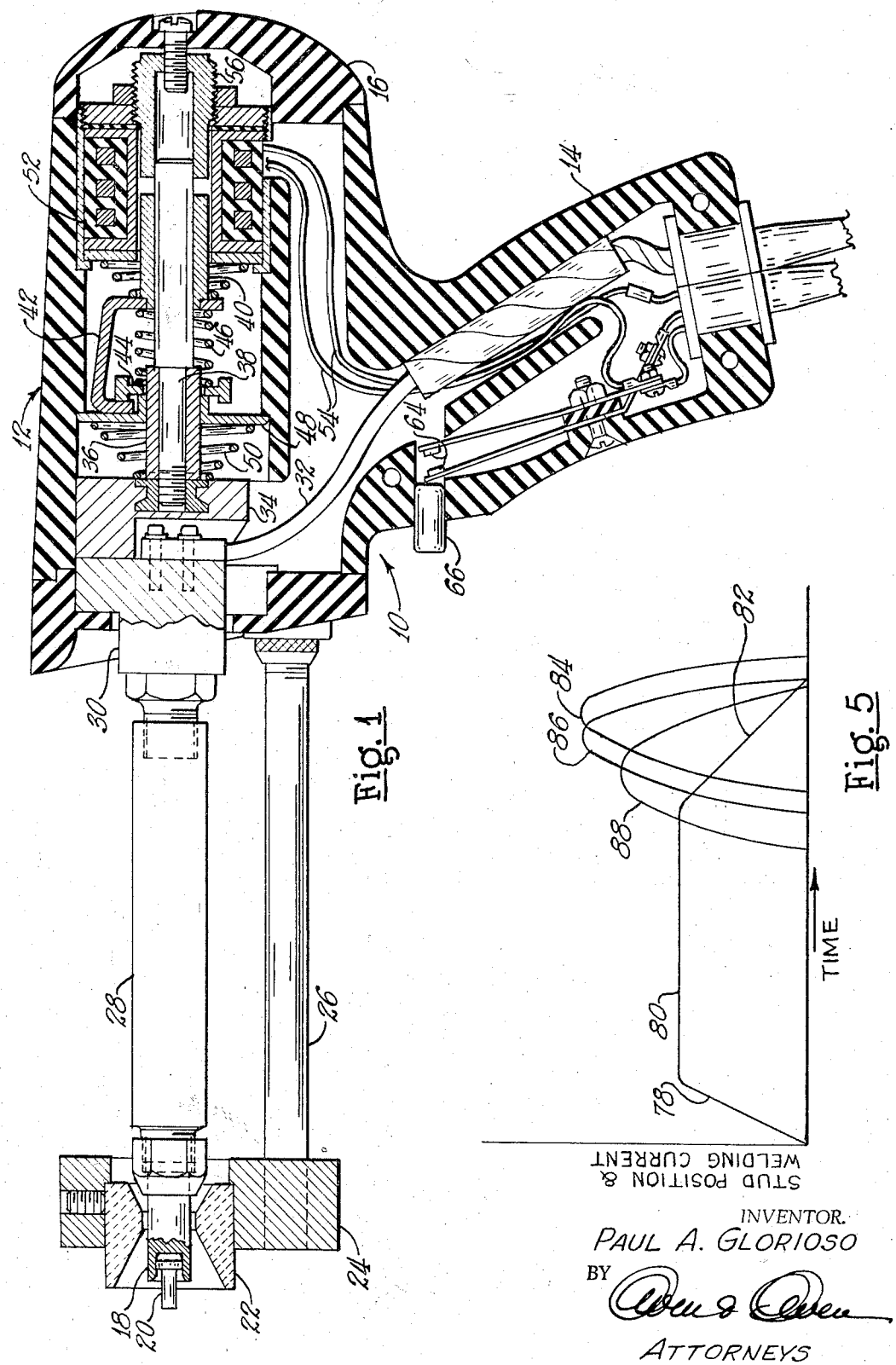

3,291,958
STUD WELDING
Paul A. Glorioso, Amherst, Ohio, assignor to Gregory Industries, Inc., Lorain, Ohio, a corporation of Michigan
Filed June 5, 1964, Ser. No. 372,764
18 Claims. (Cl. 219—98)

This invention relates to the art of end welding a stud to a workpiece and more particularly to means for welding a stud to a workpiece in a series of carefully controlled steps.

In a typical arc welding cycle performed with an arc welding tool, a stud is first pressed against the workpiece to place it in good electrical contact therewith and a trigger of the tool is then pulled to initiate the end welding operation. The stud is withdrawn from the workpiece to a retracted position and a pilot arc is established between the stud and the workpiece. A main welding arc is then struck between the stud and the workpiece while the stud is retracted or at the beginning of its plunge toward the workpiece. The main welding arc is believed to form small pools of molten metal on the end of the stud and on the workpiece at the point where the stud is to be affixed. These pools of metal solidify at the end of the plunge, after the stud contacts the workpiece, to complete the weld. The timing relationship between the plunge and the initiation of the main welding arc is extremely important. This is particularly true when the source of welding power is a condenser which discharges in a very brief period of time. If the welding arc is started too late, a dead short will occur between the stud and the workpiece at the end of the plunge if the weld current is still on and the full welding power will not be utilized, resulting in a weak weld. If the welding arc is initiated even later, it may be ineffective to melt the stud end and the workpiece at all, in which case no weld will be effected. On the other hand, if the welding arc is initiated early, the small pools of molten metal will solidify before they contact one another so that, again, a weak weld or no weld at all will be made. The ultimate timing relationship between the initiation of the welding arc and the plunge will vary according to certain factors. This timing relationship depends, for example, on the type of power source employed, the particular welding tool used, the size and shape of the stud, the characteristics of the metal from which it is made, and the size, thickness, and material of the workpiece, as well as the condition of the surface of the workpiece.

The present invention relates to welding apparatus having controllable means for timing the plunge stroke of the stud and chuck and independently controllable means for timing the initiation of the welding arc so that both the plunge and the onset of the arc can be carefully controlled.

The present invention also provides a safety circuit by which the main power supply or the welding current source can be shut off should a charge be established between the chuck and the workpiece which exceeds a predetermined value. Such a charge can be imposed, for example, if certain electrical components should fail.

The invention further provides improved voltage control means for charging a condenser or capacitor which can be used to store power for the welding operation.

In summary, the present invention provides welding apparatus including welding controls which are capable of timing the plunge stroke of the stud and of timing the initiation of the welding arc. The invention further provides independently controllable means for varying the timing of the plunge stroke of the stud and varying the timing of the initiation of the welding arc. The invention also provides a semiconductor controlled rectifier for controlling the main welding power supplied to the stud and the workpiece to initiate the main welding arc and means for sensing the voltage across the stud and the workpiece for shutting off the main power supply from the stud and workpiece if the voltage should exceed a safe level, in the event of failure of the semiconductor controlled rectifier. Further, the invention provides, in one form, a capacitor as the power source for supplying welding power to the stud and the workpiece in combination with an improved charging circuit for recharging the capacitor after the welding cycle.

It is, therefore, an object of the invention to provide means for welding a stud to a workpiece with the plunge stroke of the stud and the initiation of the welding arc being fully controllable and independently adjustable.

Another object of the invention is to provide means for end welding studs which includes a safety circuit for shutting off power should a charge exceeding a predetermined value be imposed across the stud and the workpiece.

Still another object of the invention is to provide stud welding means utilizing a condenser or capacitor for the power source and having improved means for controlling the charge on the condenser.

Numerous other objects and advantages of the invention will be apparent from the following detailed description of preferred embodiments thereof, reference being made to the accompanying drawings, in which:

FIG. 1 is a view in longitudinal, vertical cross section of one suitable welding tool used in connection with the invention;

FIG. 2 is an electrical diagram of a circuit embodying the invention;

FIGS. 3 and 4 are circuit diagrams embodying modifications of a portion of the circuit shown in FIG. 2; and FIG. 5 is a graph illustrating the travel of a stud during a welding operation and the discharge of a welding condenser in cooperation with the travel of the stud, three welding arcs being shown.

Referring to the drawings, and particularly to FIG. 1, a welding tool 10 can be of a number of suitable types. In any event, the tool for welding a stud by a drawn arc method must include means for retracting a stud from a workpiece, and means for moving the stud toward and against the workpiece. Means are usually provided for holding the stud in the retracted position until the stud is again moved toward and against the workpiece. However, in a fast-cycling tool, the holding period may be short or practically non-existent, in which case no holding means may be necessary. The welding tool 10, as shown, includes a main body or housing 12 of suitable dielectric material, the body having an integral pistol grip 14 and a separable rear end cap 16. A chuck 18 is located at the front end of the tool and holds a stud 20 during the welding operation. The chuck 18 in this instance is surrounded by a permanent spark shield 22 attached to a welding foot 24 which is adjustably supported by two legs 26, as is well known in the art. A ceramic ferrule can be used in place of the spark shield 22 and, for some applications, no shield or ferrule at all may be needed.

The chuck 18 is attached to chuck leg 28 which is threadedly engaged with a cable clamp 30 slidably supported in a forward portion of the body 12. Welding current is supplied by a flexible main welding cable 32 to the cable clamp 30 and through the chuck leg 28 to the chuck 18 and the stud 20 carried thereby.

Attached to the rear of the cable clamp 30 is a rear cable clamp part 34 which is suitably connected to a lift rod 36 having a guide rod 38 extending rearwardly through a movable core 40. A lifting hook 42 is attached to the movable core 40 and is positioned to engage a lifting ring 44 when moved rearwardly by the core 40. The ring 44 has an inner diameter slightly exceeding the outer diameter of the lift rod 36 and the ring is maintained in a perpendicular position by a lifting ring spring 46 which urges the ring 44 against a stop plate 48, held in place by a return or plunge spring 50. In this position, the lifting ring 44 is free of the lift rod 36 which can move therethrough so as to retract when the stud and the chuck are moved from an extended position to a slighly retracted, initial welding position at the time the stud 20 and the shield 22 are pressed against the workpiece. This initial welding position may vary slightly for variations in the length of the stud held by the chuck. When the lifting hook 42 engages the lifting ring 44, the ring moves to a canted position in which it engages the lifting rod 36 and retracts it to a fully retracted position when the core 40 moves toward the rear. In this manner, the stud and the chuck will be retracted a predetermined distance even though the length of the stud in the chuck may differ from the lengths of other studs.

The movable core 40 is retracted when current is supplied to a lifting and holding coil 52 through suitable leads 54. The rearward movement of the core 40, which determines the extent of the lift of the stud 22 and the chuck 18, is limited by an adjustable core piece 56 which can be turned toward or away from the movable core 40 to vary the length of the lift stroke as well as the length of the plunge stroke.

The operation and control of the tool 10 is effected with a circuit embodying the invention shown in FIG. 2. In this circuit, a condenser or capacitor is used for the storage of power for the welding current. While the timing means in accordance with the invention is particularly effective for use with welding operations where a condenser is the power source, because the short duration of the condenser discharge requires close timing, the invention need not be limited to condenser-discharge welding in its broadest aspect.

*Main welding circuit*

The stud 20, the chuck 18, and the plunge spring 50 are shown schematically in FIG. 2 with the main welding cable connected to one side of a main welding condenser 58 through a main silicon controlled rectifier SCR1 which controls the discharge of the condenser 58 through the stud. A workpiece 60 is connected to the other side of the condenser 58 through an impedance 62 shown in the form of an inductance. The impedance 62 serves to spread the discharge of the condenser somewhat and lower the peak thereof, as discussed more fully in a copending application of Paul A. Glorioso, Serial No. 99,550. A pilot arc circuit is established in parallel with the rectifier SCR1 through a second silicon controlled rectifier SCR2 and an impedance shown in the form of a resistance R1.

In the operation of the main welding circuit, the rectifier SCR2 is fired or keyed to cause it to conduct and thereby to establish a pilot arc at approximately the time the stud 20 is lifted from the workpiece 60. Subsequently, the rectifier SCR1 is fired to establish the main welding arc between the stud 20 and the workpiece 60 by the discharge of the condenser 58 through the impedance 62. The stud 20 and the workpiece 60 are heated sufficiently by the main welding arc to effect welding of the stud to the workpiece when the stud is plunged into contact with the workpiece by the spring 50.

*Starting circuit*

The stud welding operation is initiated with the aid of that portion of the circuitry designated "Starting" in FIG. 2. To initiate the operation, contacts 64 are closed by a trigger 66 (see FIG. 1) to connect a control relay CR1 with a source of power in the form of a secondary winding 68 of a first power transformer. The circuit is completed, however, only if the stud 20 is in contact with the workpiece 60 to complete an electrical connection between the points "X" and "Y," with the point "X" being electrically associated with the workpiece 60 and the point "Y" being electrically associated with the chuck 18. This prevents premature operation if the tool is not in welding position when the trigger 66 is pressed. Normally-open contacts CR1–1 of the relay CR1 then close to complete a circuit between the relay CR1 and a capacitor C1 which discharges to hold in the control relay CR1 for a sufficient period of time to complete a weld, even though the trigger 66 should be released and the contacts 64 opened. At the same time, normally-closed contacts CR1–2 are opened to isolate the capacitor C1, as well as a second capacitor C2, which will be discussed subsequently, from the power source. A diode D1 isolates the starting circuit from the welding circuit.

At the time that the contacts CR1–1 are closed, a circuit is also completed between a primary winding T1–P of a first pulse transformer and the second capacitor C2. When the capacitor C2 discharges across the primary windings T1–P, a pulse is established, the purpose of which will be discussed subsequently. A diode D2 isolates the capacitor C1 from the primary windings T1–P and a diode D3 blocks current from the power source to the primary windings T1–P until the contacts CR1–1 are closed. A diode D4 located across the primary windings T1–P prevents pulsing of these windings by the capacitor C1 by, in effect, establishing a short in one direction across the primary windings.

A diode D5 rectifies A.C. current from the winding 68 to charge the capacitor C1 and also blocks the capacitor C1 from pulsing the primary windings T1–P through the outer circuit. A diode D6 rectifies the power source for the capacitor C2 and also prevents the capacitor C2 from discharging to the capacitor C1. A diode D7 short circuits the reverse voltage produced through relay CR1 when deenergized and thus prevents the primary winding T1–P from pulsing a second time. A resistance R2 prevents the relay CR1 from being actuated by the power source 68 to eliminate the possibility of "motor boating."

*Chuck driving circuit*

An additional secondary winding 70 of the first power transformer supplies full wave rectified and filtered power by means of a rectifier 72 and a capacitor C3 to the lifting coil 52 of the tool 10. The current is blocked by a silicon controlled rectifier SCR3 until it is fired by a pulse from a secondary winding T1–S1 of the first pulse transformer. At this time, the silicon controlled rectifier SCR3 becomes conductive and completes the circuit to the lifting coil 52 to initiate retraction of the chuck 18 and the stud 20. The keying of the rectifier SCR3 also causes a capacitor C4 to charge through a resistance R3.

At the same time that the lifting coil 52 is energized, additional secondary windings T1–S2 of the first pulse transformer fire the rectifier SCR2 to complete a circuit for the pilot arc through the resistance R1 to establish a pilot arc between the stud 20 and the workpiece 60 as the stud is retracted.

*Synchronizing circuit*

The synchronizing circuit of the overall welding circuitry enables close control over the timing of the main welding arc and plunge stroke. The initiation of both the welding arc and the plunge stroke are timed individually and can be independently controlled to vary the welding cycle. When the control relay CR1 is energized, it also closes normally-open contacts CR1–3 which connect a power source comprising a secondary winding 74 of a second power transformer, the output of which is rectified in a full wave rectifier 76 and smoothed by a capacitor C5, to the timing circuits. When the contacts CR1–3 are closed, a capacitor C6 begins to charge with the rate of charge being determined by a variable resistance VR1. The value of the variable resistance VR1 can be externally controlled by the operator through the usual rotatable shaft or the like to change the rate of charge and thereby to change the time at which the chuck 18 and the stud 20 will begin the plunge stroke. When the charge on the capacitor C6 reaches a predetermined value, it fires a first unijunction transistor Q1 which pulses a primary winding T2–P of a second pulse transformer. This induces a pulse in a secondary winding T2–S1 of the second pulse transformer in the chuck driving circuit. The pulse induced in the secondary keys a fourth silicon controlled rectifier SCR4 which causes the capacitor C4 to discharge back across the rectifier SCR3, thereby shutting it off and deenergizing the lifting coil 52. The rectifier SCR4 also causes the capacitor C4 to recharge slowly through the coil 52, but with the charge being oppositely imposed. When the rectifier SCR3 is caused to conduct again during the next weld cycle, the capacitor C4 discharges back across the rectifier SCR4 to turn it off.

The primary T2–P also induces a pulse in an additional secondary winding T2–S2 of the second pulse transformer which connects a second timing circuit to the power source through a rectifier SCR5. A capacitor C7 is then charged and, when reaching a predetermined value, fires or keys a second unijunction transistor Q2. The time required for the capacitor C7 to reach this charge is controlled by a second variable resistance VR2 which again can be varied by the operator through the usual rotatable control shaft or other external adjustment. The unijunction transistor Q2 pulses a primary winding T3–P of a third pulse transformer which induces a pulse in a secondary winding T3–S in the main welding circuit. This fires the first silicon controlled rectifier SCR1 to connect the main welding condenser 58 across the stud 20 and the workpiece 60 to establish the main welding arc.

A zener diode ZD1 maintains constant voltage for the timing circuitry so that the charging time for the capacitors C6 and C7 can be accurately controlled. The rectifier circuit 76 and the capacitor C5 provide a filtered D.C. source of power, although any other suitable source can be employed.

With the synchronizing circuit of FIG. 2, the initiation of the plunge stroke is timed from the pressing of the trigger 66 and the energizing of the control relay CR1, which is at substantially the same time that the chuck 18 and the stud 20 are begun to be retracted. The timing of the main welding arc is then determined from the beginning of the plunge stroke of the chuck, when the first unijunction transistor Q1 is keyed. Hence, with the timing circuit of FIG. 2, the main welding arc must be struck after the plunge stroke is begun.

A typical welding cycle achieved with this synchronizing circuit is shown graphically in FIG. 5. Here, the horizontal axis represents time and the vertical axis represents the distance of the stud from the workpiece surface and also the intensity of the welding arc. For the stud, a first slanted line 78 represents the lifting stroke of the stud to the retracted position while a second horizontal line 80 represents the stud being held in the retracted position. A third, more gradually sloping line 82 represents the plunge stroke of the stud. With the synchronizing circuit of FIG. 2, the welding arc is represented by a curve 84, which arc is initiated after the plunge stroke begins, with the time lag determined by the time required to charge the capacitor C7 to a value sufficient to fire the second unijunction transistor Q2. The beginning of the welding arc is determined after the beginning of the lifting stroke by the time required to charge the capacitors C6 and C7 to their keying values. The beginning of the plunge stroke is determined after initiation of the lifting stroke by the time required to charge the capacitor C6 to a value sufficient to fire the unijunction transistor Q1.

Thus, the time at which the plunge stroke will begin and the time at which the welding arc is initiated can both be determined from the time that the lifting stroke of the stud begins or the trigger is pressed.

The particular synchronizing circuit of FIG. 2, where the timing of the plunge stroke and the welding arc are in sequence, is particularly effective for welding tools in which the plunge stroke is relatively slow. Where the plunge stroke of a particular tool is faster, or where the welding arc is spread over a longer period of time, or both, it may be desirable to initiate the welding arc at the time the plunge stroke begins or even before the plunge stroke begins.

A modified synchronizing circuit of FIG. 3 can be used to provide a wider variation in timing than that of FIG. 2. In this instance, both of the capacitors C6 and C7 begin to charge when the relay contacts CR1–3 close, with the capacitors C6 and C7 then firing the respective unijunction transistors Q1 and Q2 when charged to predetermined values. The time required to reach the predetermined values again is determined by the variable resistors VR1 and VR2. The plunge stroke and the welding arc can be controlled with the circuit of FIG. 3 so that either may begin first or both may begin simultaneously. The initiation of the welding arc and the plunge stroke again can be determined from the time required to charge the capacitors C6 and C7, both of which begin to charge when the trigger 66 is pressed or the stud begins to retract. The secondary winding T2–S2 is eliminated with the circuit of FIG. 3.

For even greater versatility, the timing circuit of FIG. 3 can be initiated by an additional timing circuit rather than by direct closing of the contacts CR1–3. For this purpose, a capacitor C8 is charged when the contacts CR1–3 of FIG. 4 are closed with this capacitor charging a third unijunction transistor Q3 when reaching a predetermined value. The transistor Q3 pulses a fourth primary winding T4–P of a fourth pulse transformer which pulses a secondary winding T4–S thereof and fires a silicon controlled rectifier SCR6. This initiates the same timing circuit of FIG. 3, with the timing for the initiation of the plunge stroke and the main welding arc again being determined by the time required to charge the capacitor C6 and C7. The time at which the plunge stroke begins after initiation of the lifting stroke is determined by adding the times required to charge the capacitors C8 and C6. Similarly, the time for initiating the welding arc after the initiation of the lift stroke is determined by adding the times required to charge the capacitor C8 and C7.

With the synchronizing circuits of FIGS. 3 and 4, the welding arc can occur after the plunge stroke begins as represented by the curve 84 of FIG. 5; they can begin at the same time, as represented by a curve 86; or the welding arc can begin earlier, as represented by a curve 88. The arc represented by the curve 88 is slightly less intense and broader than the arcs represented by the curves 84 and 86 by using a different impedance in the welding circuit. The more widely spread arc represented by the curve 88 is easier to coordinate with the plunge stroke, of course, since it is spread over a longer period of time. In any event, it is usually desired to maintain the welding arc substantially until the stud contacts the workpiece, or later, to prevent the possibility of the small pools of molten metal on the stud and the workpiece freezing after the arc is extinguished.

The plunge stroke terminates, of course, when the stud contacts the workpiece and with the capacitor power source for the welding arc, the arc extinguishes automatically when the capacitor is discharged. Where a generator or other source of power is used for the welding arc, the termination of the arc can be determined by suitable timing means in the circuit, such as a time delay relay, as heretofore known.

Safety circuit

Particularly with the solid state circuitry shown, there is the possibility of a dangerous voltage being impressed across the stud and the workpiece should certain components fail. For example, if the silicon controlled rectifier SCR1 should break down and short out when the stud 20 is spaced from the workpiece 60, the full charge of the welding capacitor 58 will be placed across the stud and the workpiece or the chuck and the workpiece. This can provide a dangerous shock which can be eliminated with the safety circuit of FIG. 2 which shuts off the power if the voltage across the chuck and the workpiece should exceed a predetermined amount. A constant, filtered source of power is established by a secondary winding 90 of a third power transformer, a rectifier 92, and a capacitor C9. The third power transformer normally energizes a drop-out relay DR when the first power transformer is on. The relay DR has a pair of contacts DR-1 in the line for the first power transformer or in the main power leads for all three transformers, if desired. Rather than placing the contacts DR-1 on the main power lines, they can also be used in the main welding circuit between the capacitor and the chuck. The relay DR also has a second set of normally-closed contacts DR-2 across the welding capacitor 58 which are open when the relay DR is energized but which close if it is deenergized in order to discharge the capacitor 58.

A silicon controlled rectifier SCR7 is located in parallel with the drop-out relay DR and can be fired by a unijunction transistor Q4 when a capacitor C10 builds up a predetermined charge. When the rectifier SCR7 is fired, it, in effect, shorts out the drop-out relay DR, thereby shutting off the power and discharging the welding capacitor. The charge on the capacitor C10 is determined by the charge or voltage differential across the chuck 18 and the workpiece 60, as measured across the points "X" and "Y", which charge is divided by a voltage divider including resistances R4 and R5. These are selected to cause the capacitor C10 to fire the rectifier SCR7 and to drop out the relay DR if the charge across the chuck and workpiece exceeds fifty volts, for example, which voltage is above that normally encountered during a welding cycle. This voltage also, of course, will be below that which will be impressed across the chuck and workpiece if the rectifier SCR1 should break down. The capacitor C10 is capable of absorbing any sudden "spikes" which develop during the welding cycle without firing the unijunction transistor Q4.

Voltage control circuit

It is important that the main welding capacitor 58 be recharged to the same voltage every time to maintain consistent welds. The voltage control circuit of FIG. 2 enables the capacitor 58 to be charged within a range of ±0.1 volt compared to a range of up to 15 volts in voltage control circuits heretofore used. This is made possible because the voltage is regulated every half cycle of the charge power.

To charge the capacitor 58, a single source of power is used, shown as a secondary winding 94 and a rectifier 96, although any source of A.C. or A.C.-rectified current can be used as long as it is unfiltered so as to periodically return to zero. A fourth set of contacts CR1-4 of the control relay CR1 are opened during a welding cycle to isolate the capacitor 58 from the voltage source. Otherwise, the contacts CR1-4 are closed and the charge applied to the welding capacitor 58 is controlled by a silicon controlled rectifier SCR8. This, in turn, is fired or keyed by a secondary T5-S of a fifth pulse transformer which receives a pulse from a primary winding T5-P. The primary T5-P is pulsed through a fifth unijunction transistor Q5 when energized by a capacitor C11. While the unijunction transistor Q5 is preferred, other pulse generating means such as a neon tube or a Shockley diode can be employed.

The power for charging the capacitor C11 is taken from the output of a transistor TR1 which receives a voltage from a voltage divider network comprising a resistance R6 and a tap 98. This voltage is compared with a reference voltage from a zener diode ZD2 having a constant source of voltage established by a capacitor C12, a resistance R7, and a diode D8. When the voltage from the tap 98 is less than a predetermined amount, a voltage signal supplied to the capacitor C11 causes it to fire or energize the unijunction transistor Q5 and pulse the primary winding T5-P so as to energize the silicon controlled rectifier SCR8. By way of example, the reference voltage used can be six volts, in which case the voltage at the tap 98 should also be six volts when the capacitor 58 is charged to the desired voltage, which may be 200 volts, for example. A third variable resistance VR3 is located in series with the voltage divider resistance R6 to control the voltage to which the welding capacitor 58 is charged.

When the current drops to zero at the end of each half cycle, the rectifier SCR8 will shut off and remain so until keyed again during the next half cycle. The capacitor C11 is synchronized with the rectifier SCR8 through the single source of power and begins recharging at the beginning of each half cycle. The closer the tap voltage is to the reference voltage, the longer will be the time required to charge the capacitor C11 sufficient to fire the unijunction transistor Q5 and pulse the primary T5-P, after each half cycle of the rectified A.C. current begins. Consequently, the later in each half cycle will be the initiation of the firing of the silicon controlled rectifier SCR8. When the tap voltage exceeds the reference voltage, the charging of the capacitor C11 will not fire the rectifier SCR8 at all.

When the unijunction transistor Q5 is energized by the capacitor and it pulses the primary T5-P, it actually pulses it a number of times, with the frequency depending upon the magnitude of the charge from the capacitor. However, the silicon controlled rectifier SCR8 is not affected by the frequency of the pulses since, once it is fired, it remains keyed until the voltage again drops to zero, regardless of the frequency of the pulses.

A bleeder resistance R8 is placed across the main capacitor 58 to bleed excess charge therefrom. Because the rectifier SCR1 does not have perfect resistance when not keyed, the capacitor 58 will receive a slight charge, especially if a surge or spike of current is received from the source, and it is necessary to bleed off the excess charge. Also, it has been found that slightly better voltage regulation can be obtained by bleeding off part of the charge so that the rectifier SCR8 will be fired during at least a small portion of each half-wave cycle.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. Apparatus for welding a stud to a workpiece comprising means for retracting a stud, means for establishing a welding arc between the stud and the workpiece, and means for plunging the stud toward the workpiece, means for initiating the plunge stroke of the stud at a predetermined time in the weld cycle, controllable means for varying the time at which the stud is plunged toward the workpiece, means for initiating the arc at a predetermined time in the weld cycle, and controllable means for varying the time at which the arc is initiated.

2. Apparatus for welding a stud to a workpiece comprising means for retracting a stud, means for establishing a welding arc between the stud and the workpiece, and means for plunging the stud toward the workpiece, means for initiating the plunge stroke of the stud at a predetermined time in the weld cycle, means for varying the predetermined time for initiation of the plunge stroke, means for initiating the arc at a predetermined time in the weld cycle, and means for varying the time at which the arc is initiated independently of the time at which the stud is plunged toward the workpiece.

3. Apparatus for welding a stud to a workpiece comprising, in combination, means for retracting a stud, means for establishing a welding arc between the stud and the workpiece, means for plunging the stud toward the workpiece, means for initiating the plunge stroke of the stud a predetermined period of time after the stud is begun to be retracted, means for varying the length of the predetermined period by a predetermined amount, means for initiating the welding arc a second predetermined period of time after the stud is begun to be retracted, and means for varying the second predetermined period by a predetermined amount and independently of the length of the first predetermined period.

4. Apparatus for welding a stud to a workpiece comprising means for retracting a stud, means for establishing a welding arc between the stud and the workpiece, means for plunging the stud toward the workpiece, circuit means for initiating the plunge stroke of the stud at a predetermined time in the weld cycle, controllable means associated with said circuit means for varying the time at which the stud is plunged toward the workpiece, circuit means for initiating the arc at a predetermined time in the weld cycle after the plunge stroke begins, and controllable means associated with the latter circuit means for varying the time at which the arc is initiated independently of the position of the stud during the plunge stroke.

5. Apparatus for welding a stud to a workpiece comprising means for retracting a stud, means for establishing a welding arc between the stud and the workpiece, means for plunging the stud toward the workpiece, circuit means for initiating the plunge stroke of the stud at a predetermined time in the weld cycle, controllable means associated with said circuit means for varying the time at which the stud is plunged toward the workpiece, circuit means for initiating the arc at a predetermined time in the weld cycle, and controllable means associated with the latter circuit means for varying the time at which the arc is initiated independently of the time at which the stud is plunged toward the workpiece.

6. Apparatus for welding a stud to a workpiece comprising means for retracting a stud, means for establishing a welding arc between the stud and the workpiece, and means for plunging the stud toward the workpiece, circuit means including a capacitor and means actuated by said capacitor for initiating the plunge stroke of the stud at a predetermined time in the weld cycle when the charge on said capacitor reaches a predetermined value, controllable means associated with said circuit means for varying the time at which the stud is plunged toward the workpiece by varying the time in which the charge on said capacitor reaches the predetermined value, means including a capacitor and means actuated thereby for initiating the arc at a predetermined time in the weld cycle when the charge on the latter capacitor reaches a predetermined value, and controllable means associated with the latter circuit means for varying the time at which the arc is initiated by varying the time in which the charge on the latter capacitor reaches the predetermined value.

7. Apparatus according to claim 6 wherein both of said means actuated by both capacitors include unijunction transistors.

8. Apparatus for welding a stud to a workpiece comprising means for retracting a stud, means for establishing a welding arc between the stud and the workpiece, and means for plunging the stud toward the workpiece, first circuit means including a first capacitor and means actuated when said capacitor is charged to a predetermined value for initiating the plunge stroke of the stud at a predetermined time in the weld cycle, a variable resistance associated with said circuit means for controlling the time required to charge said capacitor for varying the time at which the stud is plunged toward the workpiece, second circuit means including a second capacitor and means actuated when the second capacitor is charged to a predetermined value for initiating the arc at a predetermined time in the weld cycle, and a second variable resistance associated with the second circuit means for varying the time required to charge the second capacitor for varying the time at which the arc is initiated.

9. Apparatus for welding a stud to a workpiece comprising means for holding the stud, a source of power comprising a capacitor for supplying welding power to the stud, said capacitor being substantially discharged each time a stud is welded, means for recharging the capacitor to a predetermined value comprising an additional source of power, the voltage of which periodically drops to zero, a semiconductor controlled rectifier electrically connected between the additional power source and the capacitor, a pulse transformer for keying said semiconductor controlled rectifier, pulse generating means for supplying energy to said pulse transformer, and means for energizing said pulse generating means comprising means for establishing a reference voltage, means for establishing a voltage proportional to the voltage to which the capacitor is charged, and means for comparing the reference voltage and the proportional voltage and for supplying a signal to said pulse generating means to cause said pulse generating means to key said semiconductor controlled rectifier and enable power from said additional source to be supplied to said capacitor until the voltage of said additional power source drops to zero.

10. Apparatus for welding a stud to a workpiece comprising means fo holding the stud, a source of power comprising a capacitor for supplying welding power to the stud, said capacitor being substantially discharged each time a stud is welded, means for recharging the capacitor to a predetermined value comprising an additional source of power, the voltage of which periodically drops to zero, a semiconductor controlled rectifier electrically connected between the additional power source and the capacitor, a pulse transformer for keying said semiconductor controlled rectifier, pulse generating means for supplying energy to said pulse transformer, means for energizing said pulse generating means, and means for supplying a signal to said generating means in response to the difference between the voltage impressed on the capacitor and the desired voltage, to cause said pulse generating means to key said semiconductor controlled rectifier and enable power to be supplied to said capacitor from said additional power source until the voltage of said additional power source drops to zero.

11. Apparatus for welding a stud to a workpiece comprising means for holding the stud, a source of power comprising a capacitor for supplying welding power to the stud, said capacitor being substantially discharged each time a stud is welded, means for recharging the capacitor to a predetermined value comprising an additional source of power, the voltage of which periodically drops to zero, a semiconductor controlled rectifier electrically connected between the additional power source and the capacitor, means for periodically keying said semiconductor controlled rectifier when the charge on said capacitor is less than a predetermined value, and means for constantly bleeding off part of the charge on said capacitor to cause said semiconductor controlled rectifier to be keyed occasionally, even though a stud is not being welded.

12. Apparatus for welding a stud to a workpiece comprising means for retracting a stud, means for holding the stud in the retracted position, means for establishing an arc between the stud and the workpiece comprising a capacitor for supplying welding power to the stud, said capacitor being substantially discharged each time a stud is welded, means for plunging the stud toward the workpiece, means for recharging the capacitor to a predetermined value after each weld comprising a source of power, switch means electrically connected between the source of power and the capictor, means for periodically energizing said switch means to connect the power source and the capacitor when the charge on the capacitor is less than a predetermined value and to deenergize said switch means to open said circuit when the charge on the capacitor is of a predetermined value, and means for constantly bleeding off part of the charge of said capacitor to periodically cause said switch means to close even though a stud is not being welded.

13. Apparatus for welding a stud to a workpiece comprising means for retracting a stud, means for holding the stud in the retracted position, means for establishing an arc between the stud and the workpiece comprising a capacitor for supplying welding power to the stud, said capacitor being substantially discharged each time a stud is welded, means for plunging the stud toward the workpiece, means for recharging the capacitor to a predetermined value after each weld comprising a source of power, control means electrically connected between the source of power and the capacitor, means for periodically operating said control means to connect the power source and the capacitor when the charge on the capacitor is less than a predetermined value, and means for constantly bleeding off part of the charge of said capacitor to cause said operating means to periodically operate said control means even though a stud is not being welded.

14. Apparatus for welding a stud to a workpiece comprising means for retracting a stud, means for establishing a welding arc between the stud and the workpiece, and means for plunging the stud toward the workpiece, first circuit means including a first capacitor and means actuated when said capacitor is charged to a predetermined value for initiating the plunge stroke of the stud at a predetermined time in the weld cycle, a variable resistance associated with said circuit means for controlling the time required to charge said capacitor for varying the time at which the stud is plunged toward the workpiece, second circuit means including a second capacitor and means actuated when said second capacitor is charged to a predetermined value for initiating the arc at a predetermined time in the weld cycle, a second variable resistance associated with the second circuit means for varying the time required to charge the second capacitor for varying the time at which the arc is initiated, and second means associated with said first circuit means and actuated when said first capacitor is charged to the predetermined value for operatively connecting said second circuit means so that the plunge stroke of the stud must be initiated before the arc can be struck.

15. Apparatus for welding a stud to a workpiece comprising means for retracting a stud, means for establishing a welding arc between the stud and the workpiece, and means for plunging the stud toward the workpiece, first circuit means including a first capacitor and means actuated when said capacitor is charged to a predetermined value for initiating the plunge stroke of the stud at a predetermined time in the weld cycle, a variable resistance associated with said circuit means for controlling the time required to charge said capacitor for varying the time at which the stud is plunged toward the workpiece, second circuit means including a second capacitor and means actuated when said second capacitor is charged to a predetermined value for initiating the arc at a predetermined time in the weld cycle, a second variable resistance associated with the second circuit means for varying the time required to charge the second capacitor for varying the time at which the arc is initiated, third circuit means including a third capacitor and means actuated when said third capacitor is charged to a predetermined value for operatively connecting each of said first and second circuit means, and a third variable resistance associated with said third circuit means for varying the time required to charge said third capacitor.

16. Apparatus for welding a stud to a workpiece comprising means for retracting a stud, means for establishing a welding arc between the stud and the workpiece, and means for plunging the stud toward the workpiece, first circuit means including a first capacitor, a first unijunction transistor actuated when said capacitor is charged to a predetermined value, a first pulse transformer energized by said unijunction transistor, and a first silicon controlled rectifier which is keyed when said pulse transformer is energized for initiating the plunge stroke of the stud at a predetermined time in the weld cycle, a first variable resistance associated with said circuit means for controlling the time required to charge said capacitor for varying the time at which the stud is plunged toward the workpiece, second circuit means including a second capacitor, a second unijunction transistor actuated when said second capacitor is charged to a predetermined value, a second pulse transformer energized by said second unijunction transistor, a second silicon controlled rectifier which is keyed when said second unijunction transistor is energized for initiating the arc at a predetermined time in the weld cycle, and a second variable resistance associated with the second circuit means for varying the time required to charge the second capacitor in order to vary the time at which the arc is initiated.

17. Apparatus for welding a stud to a workpiece comprising means for retracting the stud from the workpiece, means for establishing a pilot arc between the stud and workpiece as the stud is retracted from the workpiece, means for establishing a welding arc between the stud and workpiece while said pilot arc exists, means for plunging the stud toward the workpiece at a predetermined time subsequent to the initiation of the retraction of the stud, said means for establishing a welding arc including controllable circuit means for varying the period of time between the initiation of the retraction of the stud and the initiation of the welding arc, and additional controllable circuit means for varying the period of time between the initiation of the retraction of the stud and the initiation of the plunging of the stud toward the workpiece.

18. Apparatus for welding a stud to a workpiece comprising means for retracting a stud from the workpiece including a first solid state current controlling device operable to control actuation of said retracting means, means including a second solid state current controlling device for establishing a pilot arc between the stud and the workpiece upon retraction of the stud, control circuit means for actuating said first and second devices simultaneously, means for establishing a welding arc between the stud and the workpiece while said pilot arc exists including a third solid state current controlling device and variable timing circuit means controlling said third device, said control circuit means being operably connected to said timing circuit means to cause timing in of said variable timing circuit means when said first and second devices are actuated, said third device being actuated by timing out of said variable timing means to initiate establishment of the welding arc at a predetermined variable time subsequent to the initiation of the retraction of the stud.

References Cited by the Examiner

UNITED STATES PATENTS

| | | | |
|---|---|---|---|
| Re. 24,533 | 9/1958 | Riley et al. | 219—108 |
| 1,373,054 | 3/1921 | Chubb | 219—95 |
| 2,235,385 | 3/1941 | Rava | 219—113 X |
| 2,648,748 | 8/1953 | Sayer | 219—98 |
| 2,779,859 | 1/1957 | Shoup et al. | 219—98 |
| 2,796,513 | 6/1957 | Kelemen et al. | 219—98 |
| 3,064,119 | 11/1962 | Glorioso | 219—98 |
| 3,073,946 | 1/1963 | Hazel | 219—95 |

RICHARD M. WOOD, *Primary Examiner.*

ANTHONY BARTIS, *Examiner.*

R. F. STAUBLY, *Assistant Examiner.*